United States Patent
Kniesel et al.

(10) Patent No.: US 10,128,021 B2
(45) Date of Patent: Nov. 13, 2018

(54) POLYESTER FOR PROFILE EXTRUSION AND/OR PIPE EXTRUSION

(71) Applicant: BASF SE, Ludwigshafen (DE)

(72) Inventors: Simon Kniesel, Weinheim (DE); Peter Eibeck, Speyer (DE); Rainer Klenz, Hassbloch (DE)

(73) Assignee: BASF SE, Ludwigshafen (DE)

( * ) Notice: Subject to any disclaimer, the term of this patent is extended or adjusted under 35 U.S.C. 154(b) by 268 days.

(21) Appl. No.: 14/777,875

(22) PCT Filed: Mar. 7, 2014

(86) PCT No.: PCT/EP2014/054430
§ 371 (c)(1),
(2) Date: Sep. 17, 2015

(87) PCT Pub. No.: WO2014/146912
PCT Pub. Date: Sep. 25, 2014

(65) Prior Publication Data
US 2016/0276059 A1    Sep. 22, 2016

(30) Foreign Application Priority Data
Mar. 18, 2013  (EP) .................................... 13159745

(51) Int. Cl.
| | |
|---|---|
| *B29C 49/00* | (2006.01) |
| *H01B 3/42* | (2006.01) |
| *C08K 3/26* | (2006.01) |
| *C08K 3/28* | (2006.01) |
| *C08K 3/32* | (2006.01) |
| *B29C 47/00* | (2006.01) |
| *H01B 7/18* | (2006.01) |
| *H01B 13/22* | (2006.01) |
| *H01B 13/24* | (2006.01) |
| *B29K 67/00* | (2006.01) |
| *B29L 23/00* | (2006.01) |

(52) U.S. Cl.
CPC ......... *H01B 3/423* (2013.01); *B29C 47/0004* (2013.01); *B29C 47/0023* (2013.01); *B29C 49/0005* (2013.01); *C08K 3/26* (2013.01); *C08K 3/28* (2013.01); *C08K 3/32* (2013.01); *H01B 7/187* (2013.01); *H01B 13/22* (2013.01); *H01B 13/24* (2013.01); *B29K 2067/00* (2013.01); *B29L 2023/00* (2013.01); *C08K 2003/262* (2013.01); *C08K 2003/324* (2013.01)

(58) Field of Classification Search
None
See application file for complete search history.

(56) References Cited

U.S. PATENT DOCUMENTS

| | | | |
|---|---|---|---|
| 4,705,844 A | 11/1987 | Espenschied et al. | |
| 5,051,280 A * | 9/1991 | Hung ................ | C23C 18/1216 |
| | | | 423/594.17 |
| 6,262,185 B1 | 7/2001 | Heitz et al. | |
| 2012/0201986 A1 | 8/2012 | Akiba | |

FOREIGN PATENT DOCUMENTS

| | | |
|---|---|---|
| CA | 2798879 A1 | 11/2011 |
| DE | 20 147 70 A1 | 10/1970 |
| DE | 19 745 921 A1 | 4/1999 |
| EP | 214 581 A2 | 3/1987 |
| EP | 0 318 788 A2 | 6/1989 |
| WO | WO-99/20452 A1 | 4/1999 |
| WO | WO-2011/106760 A2 | 9/2011 |
| WO | WO-2011/144502 A1 | 11/2011 |
| WO | WO-2012/143314 A1 | 10/2012 |

OTHER PUBLICATIONS

Bucknall, C. B., "Toughened Plastics," *Applied Science Publishers*, London, UK, 1977.
Houben-Weyl, *Methoden der Organischen Chemie* [*Methods of Organic Chemistry*], vol. 14/1, Georg-Thieme-Verlag, Stuttgart, Germany, 1961, pp. 392-406.
Schildknecht, C.E., *Vinyl and Related Polymers*, John Wiley & Sons, Inc., New York, 1952, pp. 484-494.
Wall, L.A. (ed.), "Fluoropolymers," *Wiley-Interscience*, New York, 1972, p. 550.
Search Report in International Application No. PCT/EP2014/054430, dated May 30, 2014.

\* cited by examiner

*Primary Examiner* — Monica A Huson
(74) *Attorney, Agent, or Firm* — Marshall, Gerstein & Borun LLP

(57) ABSTRACT

Thermoplastic molding compositions containing
  A) from 29 to 99.99% by weight of a polyester,
  B) from 0.01 to 3.0% by weight of an alkali metal salt of nitrous acid or of phosphoric acid or of carbonic acid, or a mixture of these,
  based on 100% by weight of A) and B), and
  C) from 0 to 70% by weight of further additives, where the sum of the % by weight values for A) to C) is 100%.
The compositions are used in the production of cable sheathing or optical waveguide sheathing via blowmolding, profile extrusion, and/or tube extrusion.

6 Claims, No Drawings

POLYESTER FOR PROFILE EXTRUSION AND/OR PIPE EXTRUSION

CROSS-REFERENCE TO RELATED APPLICATIONS

This is the U.S. national phase of PCT/EP2014/054430, filed Mar. 7, 2014, which claims the benefit of European Patent Application No. 13159745.2, filed Mar. 18, 2013.

The invention relates to the use of thermoplastic molding compositions comprising, as essential components
A) from 29 to 99.99% by weight of a polyester,
B) from 0.01 to 3.0% by weight of an alkali metal salt of nitrous acid or of phosphoric acid or of carbonic acid, or a mixture of these, based on 100% by weight of A) and B) and also moreover
C) from 0 to 70% by weight of further additives, where the sum of the % by weight values for A) to C) is 100%,
for the production of cable sheathing or optical waveguide sheathing via blowmolding, profile extrusion, and/or tube extrusion.

The invention further relates to cable sheathing or optical waveguide sheathing obtainable via blowmolding, profile extrusion and/or tube extrusion.

Components B) of this type are described by way of example in EP-A 214581 and DE-A 2014770 as nucleating agents for compounded PET materials. The optical properties of the compounded materials were not investigated.

The specifications WO2012/143314 and WO2011/144502 disclose the addition of the abovementioned components B) for laser-transparent moldings. The specific uses for abovementioned production processes are not mentioned.

Criteria for suitability as cable sheathing and optical waveguide sheathing are disclosed by way of example in WO99/20452, where a specifically produced polyester with defined melt behavior is used.

The sheathing of optical waveguides requires a thermoplastic which gives good results when extruded and which solidifies particularly rapidly, and which has high stiffness, mostly a particularly high-molecular-weight polybutylene terephthalate. Another particularly suitable material is a PBT which is nucleated by means of talc powder and which by virtue of particularly rapid crystallization can give high throughput rates and good product properties on the finished cable. The sheathing is achieved via a process in which one or more glass fibers is/are drawn at velocities of up to 500 m/min through a polymer melt. The resultant sheathing is a thin-walled tube (typical wall thickness from 0.1 mm to 2 mm) of small diameter (from 0.5 to 6 mm), produced in a continuous extrusion process with very great length (a plurality of km). The number of glassfiber conductors used (currently up to 96) is one of the factors determining the diameter and the wall thickness of the sheathing. The sheathing protects the glass fibers within from exterior effects, e.g. mechanical loads (buckling load and torsion load) and soiling. Features of an efficient production process for the sheathing are that the PBT permits a high take-off velocity during the extrusion process and that at the same time the tube produced has maximum circularity of cross section and has uniform wall thickness, very good mechanical properties, and very good surface quality.

It was therefore an object of the present invention to provide polyester molding compositions which comply with criteria such as high stiffness and strength, low water absorption, rapid crystallization, and which comply with abovementioned criteria for processability by means of blowmolding, profile extrusion, and/or tube extrusion to give cable sheathing and/or optical waveguide sheathing.

Accordingly, the use defined in the introduction has been found. Preferred embodiments are available in the dependent claims.

The molding compositions of the invention comprise, as component A), from 29 to 99.99% by weight, preferably from 95 to 99.95% by weight, and in particular from 99.2 to 99.9% by weight, of at least one thermoplastic polyester, based on components A) and B).

At least one of the polyesters in component A) is a semicrystalline polyester. Preference is given to components A) which comprise at least 50% by weight of semicrystalline polyesters. It is particularly preferable that said proportion is 70% by weight (based in each case on 100% by weight of A)).

Based on 100% of the molding compositions made of A) to C) (i.e. inclusive of C)), these comprise
from 30 to 100% by weight of A)+B), preferably from 50 to 100% by weight, and
from 0 to 70% by weight of C), preferably from 0 to 50% by weight.

An essential constituent of the abovementioned reference quantities is that the proportion of component B) is always based on the polyester, since this ratio is intended to be within the limits mentioned.

Polyesters A) generally used are those based on aromatic dicarboxylic acids and on an aliphatic or aromatic dihydroxy compound.

A first group of preferred polyesters is that of polyalkylene terephthalates having in particular from 2 to 10 carbon atoms in the alcohol moiety.

Polyalkylene terephthalates of this type are known per se and are described in the literature. Their main chain comprises an aromatic ring which derives from the aromatic dicarboxylic acid.

There may also be substitution in the aromatic ring, e.g. by halogen, such as chlorine or bromine, or by $C_1$-$C_4$-alkyl groups, such as methyl, ethyl, iso- or n-propyl, or n-, iso- or tert-butyl groups.

These polyalkylene terephthalates may be produced by reacting aromatic dicarboxylic acids, or their esters or other ester-forming derivatives, with aliphatic dihydroxy compounds in a manner known per se.

Preferred dicarboxylic acids are 2,6-naphthalenedicarboxylic acid, terephthalic acid and isophthalic acid or mixtures of these. Up to 30 mol %, preferably not more than 10 mol %, of the aromatic dicarboxylic acids may be replaced by aliphatic or cycloaliphatic dicarboxylic acids, such as adipic acid, azelaic acid, sebacic acid, dodecanedioic acids and cyclohexanedicarboxylic acids.

Preferred aliphatic dihydroxy compounds are diols having from 2 to 6 carbon atoms, in particular 1,2-ethanediol, 1,3-propanediol, 1,4-butanediol, 1,6-hexanediol, 1,4-hexanediol, 1,4-cyclohexanediol, 1,4-cyclohexanedimethanol and neopentyl glycol, and mixtures of these.

Particularly preferred polyesters (A) are polyalkylene terephthalates derived from alkanediols having from 2 to 6 carbon atoms. Among these, particular preference is given to polyethylene terephthalate, polypropylene terephthalate and polybutylene terephthalate, and mixtures of these. Preference is also given to PET and/or PBT which comprise, as other monomer units, up to 1% by weight, preferably up to 0.75% by weight, of 1,6-hexanediol and/or 2-methyl-1,5-pentanediol.

The intrinsic viscosity of the polyesters (A) is generally in the range from 50 to 220 ml/g, preferably of at least 140 ml/g, in particular at least 145 ml/g (measured in 0.5% by weight solution in a phenol/o-dichlorobenzene mixture in a ratio by weight of 1:1) at 25° C. to ISO 1628.

Particular preference is given to polyesters whose carboxy end group content is from 0 to 100 meq/kg of polyester, preferably from 10 to 50 meq/kg of polyester and in particular from 15 to 40 meq/kg of polyester. Polyesters of this type may be produced, for example, by the process of DE-A 44 01 055. The carboxy end group content is usually determined by titration methods (e.g. potentiometry).

Particularly preferred molding compositions comprise, as component A), a mixture of polyesters, at least one being PBT. An example of the proportion of the polyethylene terephthalate in the mixture is preferably up to 50% by weight, in particular from 10 to 35% by weight, based on 100% by weight of A).

It is also advantageous, optionally, to use PET recyclates (also termed scrap PET) in a mixture with polyalkylene terephthalates, such as PBT.

Recyclates are generally:
1) those known as post-industrial recyclates: these are production wastes during polycondensation or during processing, e.g. sprues from injection molding, start-up material from injection molding or extrusion, or edge trims from extruded sheets or films.
2) post-consumer recyclates: these are plastics items which are collected and treated after utilization by the end consumer. Blow-molded PET bottles for mineral water, soft drinks and juices are easily the predominant items in terms of quantity.

Both types of recyclate may be used either as regrind or in the form of pellets. In the latter case, the crude recycled materials are isolated and purified and then melted and pelletized using an extruder. This usually facilitates handling and free-flowing properties, and metering for further steps in processing.

The recycled materials used may either be pelletized or in the form of regrind. The edge length should not be more than 10 mm and should preferably be less than 8 mm.

Because polyesters undergo hydrolytic cleavage during processing (due to traces of moisture) it is advisable to predry the recycled material. Residual moisture content after drying is preferably <0.2%, in particular <0.05%.

Another class to be mentioned is that of fully aromatic polyesters deriving from aromatic dicarboxylic acids and aromatic dihydroxy compounds.

Suitable aromatic dicarboxylic acids are the compounds previously described for the polyalkylene terephthalates. The mixtures preferably used are made from 5 to 100 mol % of isophthalic acid and from 0 to 95 mol % of terephthalic acid, in particular from about 50 to about 80% of terephthalic acid and from 20 to about 50% of isophthalic acid.

The aromatic dihydroxy compounds preferably have the general formula

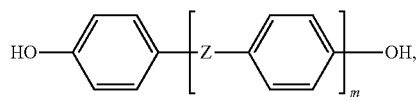

in which Z is an alkylene or cycloalkylene group having up to 8 carbon atoms, an arylene group having up to 12 carbon atoms, a carbonyl group, a sulfonyl group, an oxygen atom or sulfur atom, or a chemical bond, and in which m has the value from 0 to 2. The phenylene groups in the compounds may also have substitution by $C_1$-$C_6$-alkyl groups or alkoxy groups, and fluorine, chlorine, or bromine.

Examples of parent compounds for these compounds are
dihydroxybiphenyl,
di(hydroxyphenyl)alkane,
di(hydroxyphenyl)cycloalkane,
di(hydroxyphenyl) sulfide,
di(hydroxyphenyl) ether,
di(hydroxyphenyl) ketone,
di(hydroxyphenyl) sulfoxide,
α,α'-di(hydroxyphenyl)dialkylbenzene,
di(hydroxyphenyl) sulfone, di(hydroxybenzoyl)benzene,
resorcinol, and
hydroquinone, and also the ring-alkylated and ring-halogenated derivatives of these.

Among these, preference is given to
4,4'-dihydroxybiphenyl,
2,4-di(4'-hydroxyphenyl)-2-methylbutane,
α,α'-di(4-hydroxyphenyl)-p-diisopropylbenzene,
2,2-di(3'-methyl-4'-hydroxyphenyl)propane, and
2,2-di(3'-chloro-4'-hydroxyphenyl)propane,
and in particular to
2,2-di(4'-hydroxyphenyl)propane,
2,2-di(3',5-dichlorodihydroxyphenyl)propane,
1,1-di(4'-hydroxyphenyl)cyclohexane,
3,4'-dihydroxybenzophenone,
4,4'-dihydroxydiphenyl sulfone and
2,2-di(3',5'-dimethyl-4'-hydroxyphenyl)propane
and mixtures of these.

It is, of course, also possible to use mixtures of polyalkylene terephthalates and fully aromatic polyesters. These generally comprise from 20 to 98% by weight of the polyalkylene terephthalate and from 2 to 80% by weight of the fully aromatic polyester.

It is, of course, also possible to use polyester block copolymers, such as copolyetheresters. Products of this type are known per se and are described in the literature, e.g. in U.S. Pat. No. 3,651,014. Corresponding products are also available commercially, e.g. Hytrel® (DuPont).

In the invention, the term polyester includes halogen-free polycarbonates. Examples of suitable halogen-free polycarbonates are those based on biphenols of the general formula

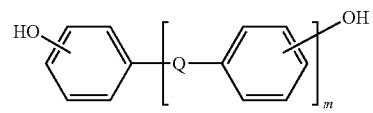

in which Q is a single bond, a $C_1$-$C_8$-alkylene group, a $C_2$-$C_3$-alkylidene group, a $C_3$-$C_6$-cyclo-alkylidene group, a $C_6$-$C_{12}$-arylene group, or else —O—, —S— or —$SO_2$—, and m is a whole number from 0 to 2.

The phenylene radicals of the biphenols may also have substituents, such as $C_1$-$C_6$-alkyl or $C_1$-$C_6$-alkoxy.

Examples of preferred biphenols of this formula are hydroquinone, resorcinol, 4,4'-dihydroxydiphenyl, 2,2-bis(4-hydroxyphenyl)propane, 2,4-bis(4-hydroxyphenyl)-2-methylbutane and 1,1-bis(4-hydroxyphenyl)cyclohexane. Particular preference is given to 2,2-bis(4-hydroxyphenyl) propane and 1,1-bis(4-hydroxyphenyl)cyclohexane, and also to 1,1-bis(4-hydroxyphenyl)-3,3,5-trimethylcyclohexane.

Either homopolycarbonates or copolycarbonates are suitable as component A, and preference is given to the copolycarbonates of bisphenol A, as well as to bisphenol A homopolymer.

Suitable polycarbonates may be branched in a known manner, specifically and preferably by incorporating from 0.05 to 2.0 mol %, based on the total of the biphenols used, of at least trifunctional compounds, for example those having three or more phenolic OH groups.

Polycarbonates which have proven particularly suitable have relative viscosities $\eta_{rel}$ of from 1.10 to 1.50, in particular from 1.25 to 1.40. This corresponds to an average molar mass $M_w$ (weight average) of from 10 000 to 200 000 g/mol, preferably from 20 000 to 80 000 g/mol.

The biphenols of the general formula are known per se or can be produced by known processes.

The polycarbonates may, for example, be produced by reacting the biphenols with phosgene in the interfacial process, or with phosgene in the homogeneous-phase process (known as the pyridine process), and in each case the desired molecular weight is achieved in a known manner by using an appropriate amount of known chain terminators. (In relation to polydiorganosiloxane-containing polycarbonates see, for example, DE-A 33 34 782.)

Examples of suitable chain terminators are phenol, p-tert-butylphenol, or else long-chain alkylphenols, such as 4-(1,3-tetramethylbutyl)phenol, as in DE-A 28 42 005, or monoalkylphenols, or dialkylphenols with a total of from 8 to 20 carbon atoms in the alkyl substituents, as in DE-A 35 06 472, such as p-nonylphenol, 3,5-di-tert-butylphenol, p-tert-octylphenol, p-dodecylphenol, 2-(3,5-dimethylheptyl)phenol and 4-(3,5-dimethylheptyl)phenol.

For the purposes of the present invention, halogen-free polycarbonates are polycarbonates made from halogen-free biphenols, from halogen-free chain terminators and, if appropriate, from halogen-free branching agents, where the content of subordinate amounts at the ppm level of hydrolyzable chlorine, resulting, for example, from the production of the polycarbonates with phosgene in the interfacial process, is not regarded as meriting the term halogen-containing for the purposes of the invention. Polycarbonates of this type with contents of hydrolyzable chlorine at the ppm level are halogen-free polycarbonates for the purposes of the present invention.

Other suitable components A) which may be mentioned are amorphous polyester carbonates, where phosgene has been replaced, during the preparation, by aromatic dicarboxylic acid units, such as isophthalic acid and/or terephthalic acid units. For further details reference may be made at this point to EP-A 711 810.

Other suitable copolycarbonates with cycloalkyl radicals as monomer units have been described in EP-A 365 916.

The molding compositions of the invention comprise, as component B), from 0.01 to 3% by weight, preferably from 0.05 to 2% by weight, and in particular from 0.1 to 0.8% by weight, based on 100% by weight of A)+B), of an alkali metal salt of nitrous acid or of phosphoric acid or of carbonic acid, or a mixture of these.

Preferred alkali metals are sodium and/or potassium.

Preferred salts B) of nitrous acid are sodium nitrite and/or potassium nitrite, or a mixture of these.

Processes for producing abovementioned inorganic salts B) are known to the person skilled in the art.

$NaHCO_3$ is a white, odor-free powder which is obtainable via saturation of soda solution with $CO_2$ in the Solvay process

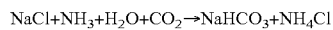

or via introduction of $CO_2$ into sodium hydroxide solution.

Sodium carbonate $Na_2CO_3$ (also termed soda) is obtainable commercially in the form of anhydrous soda or else with 10, 7, or 1 molecules of water of crystallization.

It is produced either by the Leblanc process (from $NaCl+H_2SO_4$) or by the Solvay process (calcination of $NaHCO_3$), and it also occurs naturally in the form of natural soda.

$K_2CO_3$ (potash) is a white powder and is generally produced via the magnesia process. $KHCO_3$ is generally produced via introduction of $CO_2$ into $K_2CO_3$ solutions, and is obtainable commercially in the form of white crystalline powder.

The aspect ratio (ratio of the longest dimension to the shortest dimension for nonspherical particles) of particularly preferred components B), preferably $Na_2CO_3$, is from 1 to 6, preferably from 1 to 2.9, and in particular from 1 to 2. This parameter is generally measured visually from optical micrographs.

Particle size distribution is usually determined by means of light scattering in accordance with DIN 13320-1 (Mastersizer 2100 equipment from Malvern).

The $d_{50}$ value for the particle size of particularly preferred components B), preferably $Na_2CO_3$, is <500 µm, preferably from 20 to 200 µm, very particularly from 40 to 150 µm. (50% by volume of the particles have a diameter smaller than the stated $d_{50}$ value, and the definition of $d_{10}$ and $d_{90}$ values is analogous.)

The $d_{10}$ value is preferably ≤250 µm, in particular from 10 to 100 µm, and very particularly from 20 to 80 µm.

The $d_{90}$ value is preferably ≤1000 µm, in particular from 50 to 300 µm, and very particularly from 100 to 250 µm.

Preferred salts B) of phosphoric acid are $Na_3PO_4$, $K_3PO_4$, $K_2HPO_4$ and $Na_2HPO_4$, or a mixture of these.

Preferred salt mixtures B) are mixtures of carbonates with phosphates, preferably $Na_2CO_3$ with $Na_3PO_4$. Preferred mixing ratio by weight is phosphate:carbonate=from 1:4 to 1:10, preferably from 1:4 to 2:5.

The molding compositions of the invention can comprise, as component C), from 0 to 70% by weight, in particular up to 50% by weight, of further additives and processing aids which differ from B) and/or A), based on 100% by weight of A), B), and C).

Examples of conventional additives C) are amounts of up to 40% by weight, preferably up to 15% by weight, of elastomeric polymers (often also termed impact modifiers, elastomers, or rubbers).

These very generally involve copolymers, which are preferably composed of at least two of the following monomers: ethylene, propylene, butadiene, isobutene, isoprene, chloroprene, vinyl acetate, styrene, acrylonitrile, and acrylates and, respectively, methacrylates having from 1 to 18 carbon atoms in the alcohol component.

Polymers of this type are described, for example, in Houben-Weyl, Methoden der organischen Chemie, Vol. 14/1 (Georg Thieme Verlag, Stuttgart, Germany, 1961), pages 392-406, and in the monograph by C. B. Bucknall, "Toughened Plastics" (Applied Science Publishers, London, 1977).

Some preferred types of such elastomers are described below.

Preferred types of elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenyl-norbornenes, such as 5-ethylidene-2-norbornene, 5-butyl-idene-2-norbornene, 2-methallyl-5-norbornene and 2-iso-propenyl-5-norbornene, and tricyclodienes, such as 3-methyltricyclo[5.2.1.0$^{2,6}$]-3,8-decadiene, or a mixture of these. Preference is given to 1,5-hexadiene, 5-ethylidenenor-bornene and dicyclopentadiene. The diene content of the EPDM rubbers is preferably from 0.5 to 50% by weight, in particular from 1 to 8% by weight, based on the total weight of the rubber.

EPM and EPDM rubbers may preferably also have been grafted with reactive carboxylic acids or with derivatives of these. Examples of these are acrylic acid, methacrylic acid and derivatives thereof, e.g. glycidyl (meth)acrylate, and also maleic anhydride.

Copolymers of ethylene with acrylic acid and/or meth-acrylic acid and/or with the esters of these acids are another group of preferred rubbers. The rubbers may also comprise dicarboxylic acids, such as maleic acid and fumaric acid, or derivatives of these acids, e.g. esters and anhydrides, and/or monomers comprising epoxy groups. These monomers com-prising dicarboxylic acid derivatives or comprising epoxy groups are preferably incorporated into the rubber by adding to the monomer mixture monomers comprising dicarboxylic acid groups and/or epoxy groups and having the general formula I, II, III or IV

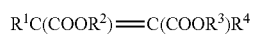

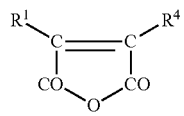

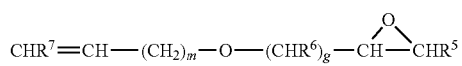

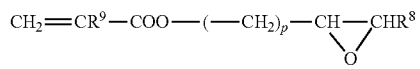

where $R^1$ to $R^9$ are hydrogen or alkyl groups having from 1 to 6 carbon atoms, and m is a whole number from 0 to 20, g is a whole number from 0 to 10 and p is a whole number from 0 to 5.

$R^1$ to $R^9$ are preferably hydrogen, where m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and (meth)acrylates compris-ing epoxy groups, such as glycidyl acrylate and glycidyl methacrylate, and the esters with tertiary alcohols, such as tert-butyl acrylate. Although the latter have no free carboxy groups, their behavior approximates to that of the free acids and they are therefore termed monomers with latent carboxy groups.

The copolymers are advantageously composed of from 50 to 98% by weight of ethylene, from 0.1 to 20% by weight of monomers comprising epoxy groups and/or methacrylic acid and/or monomers comprising anhydride groups, the remaining amount being (meth)acrylates.

Particular preference is given to copolymers composed of
from 50 to 98% by weight, in particular from 55 to 95% by weight, of ethylene,
from 0.1 to 40% by weight, in particular from 0.3 to 20% by weight, of glycidyl acrylate and/or glycidyl methacrylate, (meth)acrylic acid and/or maleic anhydride, and
from 1 to 45% by weight, in particular from 10 to 40% by weight, of n-butyl acrylate and/or 2-ethylhexyl acrylate.

Other preferred (meth)acrylates are the methyl, ethyl, propyl, isobutyl and tert-butyl esters.

Besides these, comonomers which may also be used are vinyl esters and vinyl ethers.

The ethylene copolymers described above may be pro-duced by processes known per se, preferably by random copolymerization at high pressure and elevated temperature. Appropriate processes are well known.

Other preferred elastomers are emulsion polymers whose production is described, for example, by Blackley in the monograph "Emulsion polymerization". The emulsifiers and catalysts which can be used are known per se.

In principle it is possible to use homogeneously structured elastomers or those with a shell structure. The shell-type structure is determined by the sequence of addition of the individual monomers. The morphology of the polymers is also affected by this sequence of addition.

Monomers which may be mentioned here, merely as examples, for the production of the rubber fraction of the elastomers are acrylates, such as n-butyl acrylate and 2-eth-ylhexyl acrylate, corresponding methacrylates, butadiene and isoprene, and also mixtures of these. These monomers may be copolymerized with other monomers, such as sty-rene, acrylonitrile, vinyl ethers and with other acrylates or methacrylates, such as methyl methacrylate, methyl acry-late, ethyl acrylate or propyl acrylate.

The soft or rubber phase (with a glass transition tempera-ture of below 0° C.) of the elastomers may be the core, the outer envelope or an intermediate shell (in the case of elastomers whose structure has more than two shells). Elas-tomers having more than one shell may also have more than one shell made from a rubber phase.

If one or more hard components (with glass transition temperatures above 20° C.) are also involved, besides the rubber phase, in the structure of the elastomer, these are generally produced by polymerizing, as principal mono-mers, styrene, acrylonitrile, methacrylonitrile, α-methylsty-rene, p-methylstyrene, or acrylates or methacrylates, such as methyl acrylate, ethyl acrylate or methyl methacrylate. Besides these, it is also possible to use relatively small proportions of other comonomers here.

It has proven advantageous in some cases to use emulsion polymers which have reactive groups at their surfaces. Examples of groups of this type are epoxy, carboxy, latent carboxy, amino and amide groups, and also functional groups which may be introduced by concomitant use of monomers of the general formula

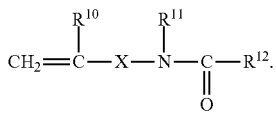

where the definitions of the substituents can be as follows:
$R^{10}$ hydrogen or a $C_1$-$C_4$-alkyl group,
$R^{11}$ hydrogen or a $C_1$-$C_8$-alkyl group or an aryl group, in particular phenyl, $R^{12}$ hydrogen, a $C_1$-$C_{10}$-alkyl group, a $C_6$-$C_{12}$-aryl group, or —$OR^{13}$ $R^{13}$ a $C_1$-$C_8$-alkyl group or a $C_6$-$C_{12}$-aryl group, optionally with substitution by O- or N-containing groups, X a chemical bond or a $C_1$-$C_{10}$-alkylene group, or a $C_6$-$C_{12}$-arylene group, or

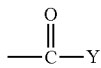

Y O—Z or NH—Z, and

Z a $C_1$-$C_{10}$-alkylene group or a $C_6$-$C_{12}$-arylene group.

The graft monomers described in EP-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also have been crosslinked. Examples of crosslinking monomers are 1,3-butadiene, divinylbenzene, diallyl phthalate and dihydrodicyclopentadienyl acrylate, and also the compounds described in EP-A 50 265.

It is also possible to use the monomers known as graft-linking monomers, i.e. monomers having two or more polymerizable double bonds which react at different rates during the polymerization. Preference is given to the use of compounds of this type in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers comprising allyl groups, in particular allyl esters of ethylenically unsaturated carboxylic acids, for example allyl acrylate, allyl methacrylate, diallyl maleate, diallyl fumarate and diallyl itaconate, and the corresponding mono-allyl compounds of these dicarboxylic acids. Besides these there is a wide variety of other suitable graft-linking monomers. For further details reference may be made here, for example, to U.S. Pat. No. 4,148,846.

The proportion of these crosslinking monomers in the impact-modifying polymer is generally up to 5% by weight, preferably not more than 3% by weight, based on the impact-modifying polymer.

Some preferred emulsion polymers are listed below. Mention may first be made here of graft polymers with a core and with at least one outer shell, and having the following structure:

| Type | Monomers for the core | Monomers for the envelope |
|---|---|---|
| I | 1,3-butadiene, isoprene, n-butyl acrylate, ethylhexyl acrylate, or a mixture of these | styrene, acrylonitrile, methyl methacrylate |

-continued

| Type | Monomers for the core | Monomers for the envelope |
|---|---|---|
| II | as I, but with concomitant use of crosslinking agents | as I |
| III | as I or II | n-butyl acrylate, ethyl acrylate, methyl acrylate, 1,3-butadiene, isoprene, ethylhexyl acrylate |
| IV | as I or II | as I or III, but with concomitant use of monomers having reactive groups, as described herein |
| V | styrene, acrylonitrile, methyl methacrylate, or a mixture of these | first envelope made of monomers as described under I and II for the core, second envelope as described under I or IV for the envelope |

These graft polymers, in particular ABS polymers and/or ASA polymers, are preferably used in amounts of up to 40% by weight for impact-modification of PBT, optionally in a mixture with up to 40% by weight of polyethylene terephthalate. Appropriate blend products are obtainable with trademark Ultradur®S (previously Ultrablend®S) from BASF AG.

Instead of graft polymers whose structure has more than one shell, it is also possible to use homogeneous, i.e. single-shell, elastomers made from 1,3-butadiene, isoprene and n-butyl acrylate or from copolymers of these. These products, too, may be produced by concomitant use of crosslinking monomers or of monomers having reactive groups.

Examples of preferred emulsion polymers are n-butyl acrylate-(meth)acrylic acid copolymers, n-butyl acrylate-glycidyl acrylate or n-butyl acrylate-glycidyl methacrylate copolymers, graft polymers with an inner core made from n-butyl acrylate or based on butadiene and with an outer envelope made from the abovementioned copolymers, and copolymers of ethylene with comonomers which supply reactive groups.

The elastomers described can also be produced by other conventional processes, e.g. via suspension polymerization.

Preference is likewise given to silicone rubbers, as described in DE-A 37 25 576, EP-A 235 690, DE-A 38 00 603 and EP-A 319 290.

It is also possible, of course, to use a mixture of the types of rubber listed above.

Fibrous or particulate fillers C) that may be mentioned are glass fibers, glass beads, amorphous silica, asbestos, calcium silicate, calcium metasilicate, magnesium carbonate, kaolin, chalk, powdered quartz, mica, barium sulfate, and feldspar. The amounts used of fibrous fillers C) are up to 60% by weight, in particular up to 35% by weight, and the amounts used of particulate fillers are up to 30% by weight, in particular up to 10% by weight.

Preferred fibrous fillers that may be mentioned are aramid fibers and potassium titanate fibers, and particular preference is given here to glass fibers in the form of E glass. These can be used in the form of rovings or of chopped glass in the forms commercially obtainable.

The amounts used of fillers that have high laser absorbency, for example carbon fibers, carbon black, graphite, graphene, or carbon nanotubes, are preferably below 1% by weight, particularly preferably below 0.05% by weight.

The fibrous fillers can have been surface-pretreated with a silane compound in order to improve compatibility with the thermoplastic.

Suitable silane compounds are those of the general formula

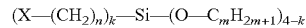

where the definitions of the substituents are as follows:

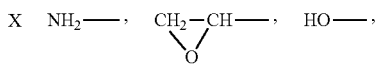

n is an integer from 2 to 10, preferably from 3 to 4
m is an integer from 1 to 5, preferably from 1 to 2
k is an integer from 1 to 3, preferably 1.

Preferred silane compounds are aminopropyltrimethoxysilane, aminobutyltrimethoxysilane, aminopropyltriethoxysilane, aminobutyltriethoxysilane, and also the corresponding silanes which comprise a glycidyl group as substituent X.

The amounts generally used of the silane compounds for surface coating are from 0.05 to 5% by weight, preferably from 0.1 to 1.5% by weight, and in particular from 0.2 to 0.5% by weight (based on C).

Acicular mineral fillers are also suitable.

For the purposes of the invention, acicular mineral fillers are a mineral filler with pronounced acicular character. An example that may be mentioned is acicular wollastonite. The L/D (length to diameter) ratio of the mineral is preferably from 8:1 to 35:1, with preference from 8:1 to 11:1. The mineral filler can, optionally, have been pretreated with the abovementioned silane compounds; however, the pretreatment is not essential.

The thermoplastic molding compositions of the invention can comprise, as component C), conventional processing aids, such as stabilizers, oxidation retarders, agents to counteract decomposition by heat and decomposition by ultraviolet light, lubricants and mold-release agents, colorants, such as dyes and pigments, plasticizers, etc.

Examples of oxidation retarders and heat stabilizers are sterically hindered phenols and/or phosphites, hydroquinones, aromatic secondary amines, such as diphenylamines, and various substituted representatives of these groups, and mixtures of these, at concentrations of up to 1% by weight, based on the weight of the thermoplastic molding compositions.

UV stabilizers that may be mentioned, generally used in amounts of up to 2% by weight, based on the molding composition, are various substituted resorcinols, salicylates, benzotriazoles, and benzophenones.

Colorants that can be added comprise inorganic and organic pigments, and also dyes, such as nigrosin, and anthraquinones. Particularly suitable colorants are mentioned by way of example in EP 1722984 B1, EP 1353986 B1, or DE 10054859 A1.

Preference is further given to esters or amides of saturated or unsaturated aliphatic carboxylic acids having from 10 to 40, preferably from 16 to 22, carbon atoms with saturated aliphatic alcohols or amines which comprise from 2 to 40, preferably from 2 to 6, carbon atoms.

The carboxylic acids can be monobasic or dibasic. Examples that may be mentioned are pelargonic acid, palmitic acid, lauric acid, margaric acid, dodecanedioic acid, behenic acid, and with particular preference stearic acid, and capric acid, and also montanic acid (a mixture of fatty acids having from 30 to 40 carbon atoms).

The aliphatic alcohols can be mono- to tetrahydric. Examples of alcohols are n-butanol, n-octanol, stearyl alcohol, ethylene glycol, propylene glycol, neopentyl glycol, and pentaerythritol, preference being given here to glycerol and pentaerythritol.

The aliphatic amines can be mono- to trifunctional. Examples of these are stearylamine, ethylenediamine, propylenediamine, hexamethylenediamine, and di(6-aminohexyl)amine, particular preference being given here to ethylenediamine and hexamethylenediamine. Preferred esters or amides are correspondingly glycerol distearate, glycerol tristearate, ethylenediamine distearate, glycerol monopalmitate, glycerol trilaurate, glycerol monobehenate, and pentaerythritol tetrastearate.

It is also possible to use a mixture of various esters or amides, or esters combined with amides, in any desired mixing ratio.

The amounts used of further lubricants and mold-release agents are usually up to 1% by weight. It is preferable to use long-chain fatty acids (e.g. stearic acid or behenic acid), salts of these (e.g. Ca stearate or Zn stearate), or montan waxes (mixtures made of straight-chain, saturated carboxylic acids having chain lengths of from 28 to 32 carbon atoms), or else Ca montanate or Na montanate, or else low-molecular-weight polyethylene waxes or low-molecular-weight polypropylene waxes.

Examples that may be mentioned of plasticizers are dioctyl phthalate, dibenzyl phthalate, butyl benzyl phthalate, hydrocarbon oils, and N-(n-butyl)benzenesulfonamide.

The molding compositions of the invention can also comprise from 0 to 2% by weight of fluorine-containing ethylene polymers. These are polymers of ethylene having fluorine content of from 55 to 76% by weight, preferably from 70 to 76% by weight.

Examples here are polytetrafluoroethylene (PTFE), tetrafluoroethylene-hexafluoropropylene copolymers, or tetrafluoroethylene copolymers having relatively small proportions (generally up to 50% by weight) of copolymerizable ethylenically unsaturated monomers. These are described by way of example by Schildknecht in "Vinyl and Related Polymers", Wiley-Verlag, 1952, pages 484 to 494, and by Wall in "Fluorpolymers" (Wiley Interscience, 1972).

These fluorine-containing ethylene polymers have homogeneous distribution in the molding compositions and preferably have a (number-average) $d_{50}$ particle size in the range from 0.05 to 10 μm, in particular from 0.1 to 5 μm. These small particle sizes can be particularly preferably achieved via use of aqueous dispersions of fluorine-containing ethylene polymers and incorporation of these into a polyester melt.

The thermoplastic molding compositions of the invention can be produced by processes known per se, by mixing the starting components in conventional mixing apparatuses, such as screw extruders, Brabender mixers, or Banbury mixers, and then extruding the same. The extrudate can be cooled and comminuted. It is also possible to premix individual components (e.g. applying component B) to the pellets, for example in a drum), then add the remaining starting materials individually and/or after they have been likewise mixed. The mixing temperatures are generally from 230 to 290° C. Component B) can also preferably be added to the extruder inlet by the hot-feed or direct method.

In another preferred method of operation, components B) and also, if appropriate, C) can be mixed with a polyester prepolymer, and compounded and pelletized. The resultant pellets are then solid-phase condensed under inert gas continuously or batchwise at a temperature below the melting point of component A) until the desired viscosity has been reached.

In another preferred production method, a masterbatch (concentrate) is first produced from A) and B), where the amount of component B incorporated into A) (based on A)+B)) is up to 20% by weight, preferably up to 10% by weight. Said concentrate in the form of pellets is fed into the polyester (without additives) during the production of the tube extrudates or profile extrudates, or is premixed in the corresponding quantitative proportion, e.g. in a tumbling mixer, and the mixture is then compounded and extruded in the form of moldings.

The molding compositions that can be used in the invention are suitable for the production of molded products by means of blowmolding, profile extrusion and tube extrusion to give cable sheathing and/or optical waveguide sheathing, since they exhibit high stiffness/strength, low water absorption, rapid crystallization, and good processability.

Such moldings have advantages in compressive strength, buckling resistance, and hydrolysis resistance.

EXAMPLES

Component A:
Polybutylene terephtalate with viscosity 155 ml/g and with terminal carboxy group content of 34 meq/kg+(Ultradur® B 6500 from BASF SE) (IV measured in 0.5% by weight solution of phenol/o-dichlorobenzene, 1:1 mixture at 25° C. in accordance with ISO 1628).
Component B/1
$Na_2CO_3$
Component B/2
$K_2CO_3$
Component B/3
$NaNO_2$
Component C/1
Talc powder
Component C/2
Ca stearate The molding compositions were produced in a ZSK25 with a flat temperature profile at from 250 to 260° C. with subsequent pelletization.

I. Testing of the Compounded Materials

TABLE 1

Compositions

| Components [% by wt.] | comp1 [% by wt.] | Inv. ex. (1) [% by wt.] | Inv. ex. (2) [% by wt.] | Inv. ex. (3) [% by wt.] |
|---|---|---|---|---|
| A | 99.9 | 99.6 | 99.6 | 99.6 |
| B/1 | — | 0.4 | — | — |
| B/2 | — | — | 0.4 | — |
| B/3 | — | — | — | 0.4 |
| C/1 | 0.04 | — | — | — |
| C/2 | 0.06 | — | — | — |

TABLE 2

Increase of melt stiffness/shear viscosity through use of additives:

| Melt volume rate [250° C./2.16 kg] | Unit | comp1 | Inv. ex. (1) | Inv. ex. (2) | Inv. ex. (3) |
|---|---|---|---|---|---|
| Retention time 4 min | cm³/10 min | 9.7 | 5.8 | 9.9 | 10.8 |
| Retention time 10 min | cm³/10 min | 11.4 | 4.4 | 8.8 | 9.7 |
| Retention time 20 min | cm³/10 min | 14.4 | 4.2 | 8.9 | 11.0 |
| Retention time 30 min | cm³/10 min | 15.9 | 4.2 | 10.3 | 10.5 |

The examples in Table (2) illustrate the improved melt stiffness when the salts of the invention are added in comparison with the polyester in which additives have not been used according to the invention. In the case of the polyester with no additives, when residence time is long the melt volume rate rises as a consequence of polymer degradation as retention time increases, but in the case of the specimens using additives the melt flow rate (determined in accordance with ISO 1133) remains constant.

TABLE 3

Increase of recrystallization temperature through use of additives

| Recrystallization | Unit | A | comp1 | Inv. ex. (1) | Inv. ex. (2) | Inv. ex. (3) |
|---|---|---|---|---|---|---|
| $T_{pc}$ | ° C. | 176.7 | 195.7 | 200.2 | 194.0 | 200.7 |

Table 3 shows calorimetric DSC studies in accordance with ISO 11357, heating and cooling rate 20 K/min. The peak temperature for crystallization $T_{pc}$ was determined in the first cooling procedure. The examples in table (3) illustrate recrystallization at elevated temperature on addition of the salts of the invention in comparison with the polyester using no additives. A very sharp rise can already be seen with material nucleated by talc powder. A further rise of from 4.5-5.0° C. is observed for the compounded materials of the invention, in comparison with comparative example comp1.

II. Production of Optical Waveguide Sheathing with Use of Additives

In a preferred process of the invention, optical waveguide sheathing products are produced using metal carbonates as additives, by way of additive concentrates. The concentrates were produced in a twin-screw extruder with 25 mm screw diameter (see table (4)). The metering of the additives was achieved here together with the pellets in the cold feed system. In a further step, the concentrates were mixed in a mixer with high-viscosity polymer pellets which used no additives. This gave optical waveguide sheathing products using high-molecular-weight polybutylene terephthalate.

TABLE 4

Production of concentrates

| Component | Conc (1) [% by wt.] | Conc (2) [% by wt.] |
|---|---|---|
| A | 95 | 95 |
| B/1 | 5 | — |
| B/2 | — | 5 |

Production of pellet mixtures of the invention:

The mixtures were produced in the form of pellets/pellet mixtures in a tumbling mixer.

TABLE 5

Composition of cable sheathing products of the invention

| Component [% by wt.] | comp1 | Inv. ex. (4) | Inv. ex. (5) |
|---|---|---|---|
| A | 99.9 | 92 | 92 |
| C/1 | 0.04 | — | — |
| C/2 | 0.06 | — | — |

TABLE 5-continued

Composition of cable sheathing products of the invention

| Component [% by wt.] | comp1 | Inv. ex. (4) | Inv. ex. (5) |
|---|---|---|---|
| Conc (1) | — | 8 | — |
| Conc (2) | — | — | 8 |

Production of sheathed optical waveguide cables:

Said pellet mixtures were further processed by means of a single-screw extruder with annular die. Production of this type of sheathing is described by way of example in the following publication: H. J. Mair; Kunststoffe in der Kabeltechnik [Plastics in cable technology], chapter 9, Expertverlag 1983. 12 glassfiber conductors were used as core for this sheathing. The internal diameter of the sheathing, resulting from the diameter of the individual glass fibers and from the geometry of their arrangement was 1.3 mm.

Characterization of the cable sheathing:

The thickness distribution of the sheathing of the invention here is 0.35+/−0.05 mm, whereas the wall thickness distribution in the prior art is in the region of 0.6+/−0.2 mm (table 6). The compounded material of the invention can therefore give cable sheathing with very little thickness variation.

TABLE 6

Appearance and thickness distribution of the sheathing

| | comp1 | Inv. ex. (4) |
|---|---|---|
| Thickness of cable sheathing | 0.6 +/− 0.2 mm | 0.35 +/− 0.05 mm |

TABLE 7

Mechanical properties of optical waveguide sheathing

| Property | Unit | comp1 | Inv. ex. (4) | Inv. ex. (5) |
|---|---|---|---|---|
| Crush resistance | N/dm | 600 | 1400 | 1300 |

The crush resistance of the cable sheathing using additives in the invention is substantially higher. Crush resistance was determined in accordance with the standard EN 187000/504.

As can be seen from table 8, the glassfiber sheathing produced by the process of the invention features improved hydrolysis resistance in comparison with the prior art.

TABLE 8

Hydrolysis resistance of the materials of the invention, based on intrinsic viscosity after various storage times

| Residence time at 85° C. and 85% relative humidity | Unit | (comp1) | Inv. ex. (4) |
|---|---|---|---|
| 0 h | cm$^3$/g | 146.5 | 141 |
| 100 h | cm$^3$/g | 110 | 135.5 |
| 250 h | cm$^3$/g | 102 | 128.5 |
| 500 h | cm$^3$/g | 92.2 | 120 |
| 1000 h | cm$^3$/g | 71.2 | 105 |
| 2000 h | cm$^3$/g | 46 | 74.7 |

The invention claimed is:

1. A method of producing cable sheathing or optical waveguide sheathing comprising
blowmolding, profile extruding, and pipe extruding a thermoplastic molding compositions comprising
A) from 29 to 99.99% by weight of a polyester,
B) from 0.01 to 3.0% by weight of an alkali metal salt of nitrous acid, phosphoric acid, carbonic acid, or a mixture of these,
based on 100% by weight of A) and B), and
C) from 0 to 70% by weight of further additives, where the sum of the % by weight values for A) to C) is 100, where the alkali metal of component B) is composed of sodium or potassium, or of a mixture of these.

2. The method according to claim 1, where the intrinsic viscosity (IV) of component A) is at least 140 ml/g in accordance with ISO 1628.

3. The method according to claim 1, where the terminal carboxy group content of component A) is from 10 to 50 meq/kg of polyester.

4. The method according to claim 1, where component B) comprises of $NaNO_2$, $KNO_2$, $Na_2CO_3$, $K_2CO_3$, $NaHCO_3$, $KHCO_3$, $Na_3PO_4$, $K_3PO_4$, $Na_2HPO_4$, $K_2HPO_4$, or a mixture of these.

5. A method of producing cable sheathing or optical waveguide sheathing comprising
blowmolding, profile extruding, and pipe extruding a thermoplastic molding compositions comprising
A) from 29 to 99.99% by weight of a polyester,
B) from 0.01 to 3.0% by weight of an alkali metal salt of nitrous acid, phosphoric acid, carbonic acid, or a mixture of these,
based on 100% by weight of A) and B), and
C) from 0 to 70% by weight of further additives, where the sum of the % by weight values for A) to C) is 100, where the intrinsic viscosity (IV) of component A) is at least 140 ml/g in accordance with ISO 1628.

6. A method of producing cable sheathing or optical waveguide sheathing comprising
blowmolding, profile extruding, and pipe extruding a thermoplastic molding compositions comprising
A) from 29 to 99.99% by weight of a polyester,
B) from 0.01 to 3.0% by weight of an alkali metal salt of nitrous acid, phosphoric acid, carbonic acid, or a mixture of these,
based on 100% by weight of A) and B), and
C) from 0 to 70% by weight of further additives, where the sum of the % by weight values for A) to C) is 100, where the terminal carboxy group content of component A) is from 10 to 50 meq/kg of polyester.

* * * * *